United States Patent
Nagatsuka

(10) Patent No.: US 10,022,860 B2
(45) Date of Patent: Jul. 17, 2018

(54) ROTATIONAL DRIVING MECHANISM IN A ROBOT

(71) Applicant: THK CO., LTD., Tokyo (JP)

(72) Inventor: Masaki Nagatsuka, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 15/512,290

(22) PCT Filed: Sep. 18, 2015

(86) PCT No.: PCT/JP2015/076619
§ 371 (c)(1),
(2) Date: Mar. 17, 2017

(87) PCT Pub. No.: WO2016/043302
PCT Pub. Date: Mar. 24, 2016

(65) Prior Publication Data
US 2017/0274525 A1      Sep. 28, 2017

(30) Foreign Application Priority Data

Sep. 19, 2014 (JP) ................................. 2014-191829

(51) Int. Cl.
*G05G 11/00* (2006.01)
*B25J 9/12* (2006.01)
(Continued)

(52) U.S. Cl.
CPC ............. *B25J 9/123* (2013.01); *B25J 9/0015* (2013.01); *B25J 17/0283* (2013.01); *B25J 9/0006* (2013.01)

(58) Field of Classification Search
CPC ...... B25J 9/123; B25J 9/0015; B25J 17/0283; B25J 9/0006
See application file for complete search history.

(56) References Cited

U.S. PATENT DOCUMENTS

| 2004/0133307 A1 | 7/2004 | Lee et al. |
| 2008/0210477 A1 | 9/2008 | Takenaka et al. |
| (Continued) | | |

FOREIGN PATENT DOCUMENTS

| CN | 1509848 A | 7/2004 |
| CN | 101213051 A | 7/2008 |
| (Continued) | | |

OTHER PUBLICATIONS

International Search Report dated Nov. 10, 2015, issued in counterpart International Application No. PCT/JP2015/076619 (2 pages).
(Continued)

*Primary Examiner* — Jake Cook
(74) *Attorney, Agent, or Firm* — Westerman, Hattori, Daniels & Adrian, LLP

(57) ABSTRACT

A rotational driving mechanism for driving a rotary member mounted on a rotatable base member includes: a first link unit that has a first link body and is mounted through a first support part on the base member, the first link unit further having an input part to which an output of the linear motion actuator is inputted at one side of the first link body, and an output part located in the first link body at an opposite side of the input part across the first support part; and a second link unit that has a second link body and is mounted through a second support part on the output part of the first link unit, the second link unit being further mounted through a third support unit on the rotary member or a connecting member joined thereto in such a manner as to be free to rotate.

8 Claims, 11 Drawing Sheets

(51) Int. Cl.
    *B25J 9/00*     (2006.01)
    *B25J 17/02*     (2006.01)

(56) References Cited

U.S. PATENT DOCUMENTS

| | | | |
|---|---|---|---|
| 2009/0071282 A1 | 3/2009 | Takemura | |
| 2011/0296944 A1 | 12/2011 | Carter et al. | |
| 2013/0090580 A1* | 4/2013 | Hong | A61H 1/0277 601/33 |
| 2014/0238177 A1 | 8/2014 | Nagatsuka | |

FOREIGN PATENT DOCUMENTS

| | | |
|---|---|---|
| JP | 48-76380 | 9/1973 |
| JP | 2011-224752 A | 11/2011 |
| JP | 2013-91122 A | 5/2013 |
| JP | 2013-91146 A | 5/2013 |
| TW | 201331001 A1 | 8/2013 |
| TW | 201428202 A | 7/2014 |
| WO | 2006/033209 A1 | 3/2006 |

OTHER PUBLICATIONS

Office Action dated Oct. 4, 2016, issued in counterpart of Japanese Patent Application No. 2014-191829 with English Translation (9 pages).

Examination Opinion Notification dated Jul. 17, 2017, issued in counterpart Taiwanese Application No. 104130959, with English translation. (6 pages).

Notification of Transmittal of Translation of the International Preliminary Report on Patentability (Form PCT/IB/338) issued in counterpart International Application No. PCT/JP2015/078819 dated Mar. 30, 2017 with Forms PCT/IB/373 and PCT/ISA/237 (7 pages).

Notification of Transmittal of Translation of the International Preliminary Report on Patentability (Form PCT/IB/338) issued in counterpart International Application No. PCT/JP2015/076624 dated Mar. 30, 2017 with Forms PCT/IB/373 and PCT/ISA/237 (6 pages).

\* cited by examiner

[Fig. 1]
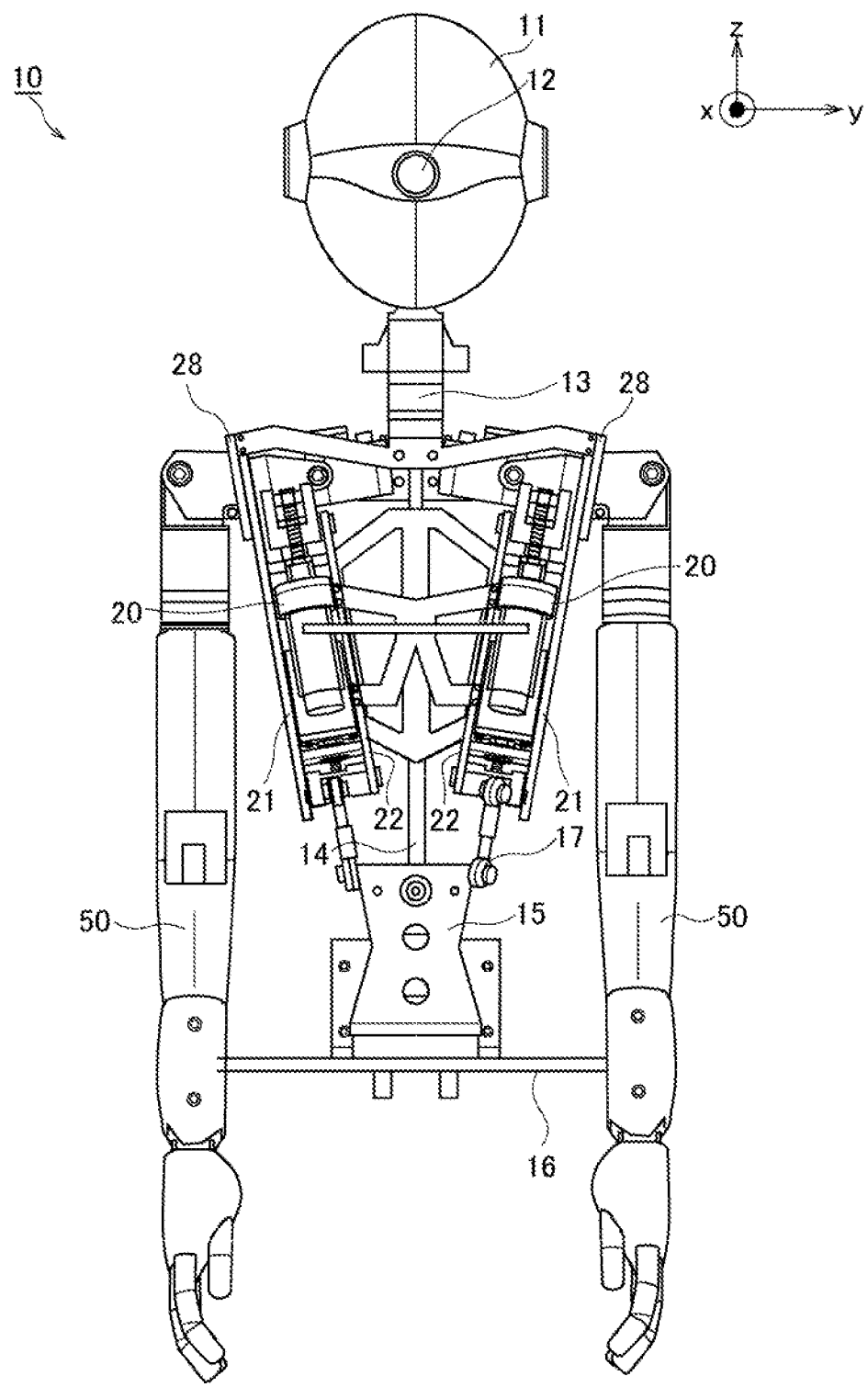

[Fig. 2]
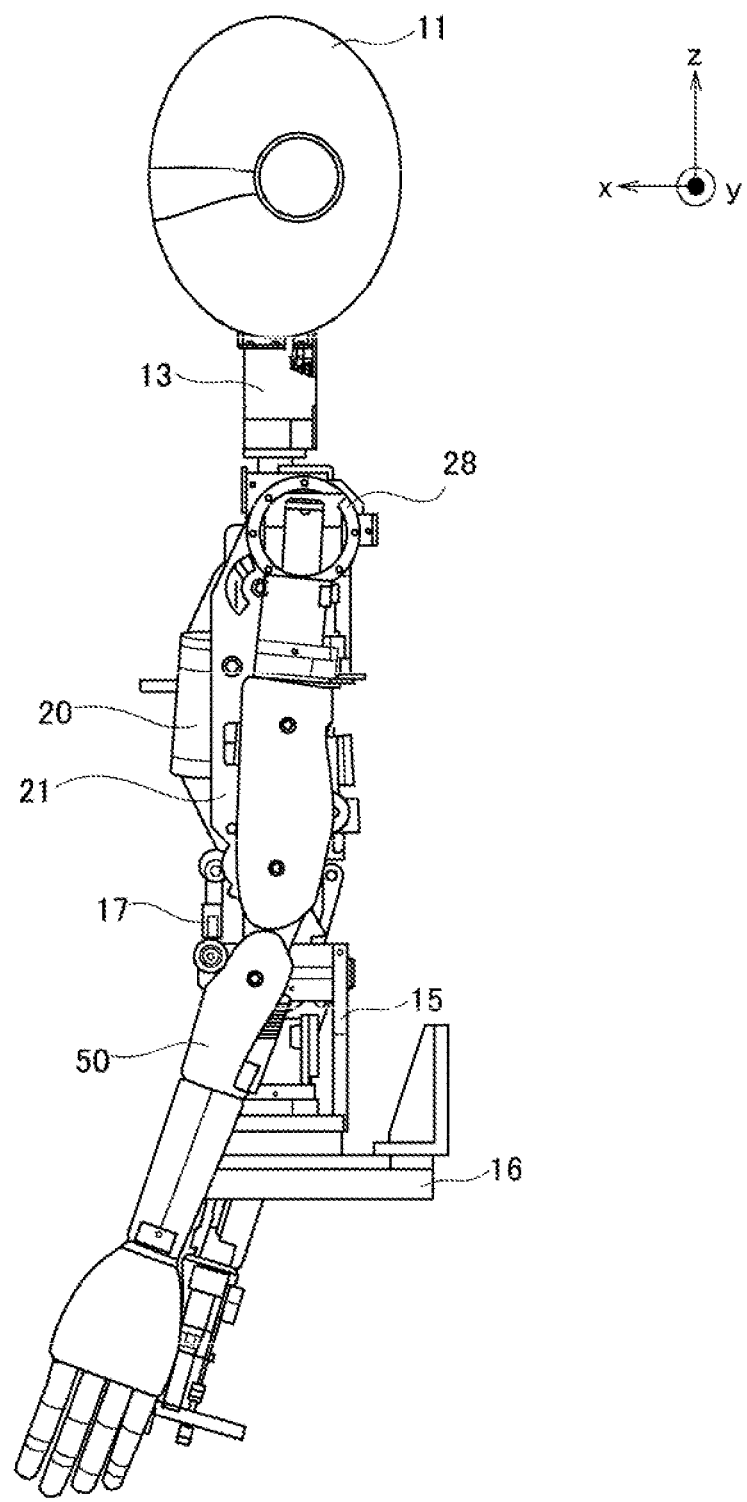

[Fig. 3]
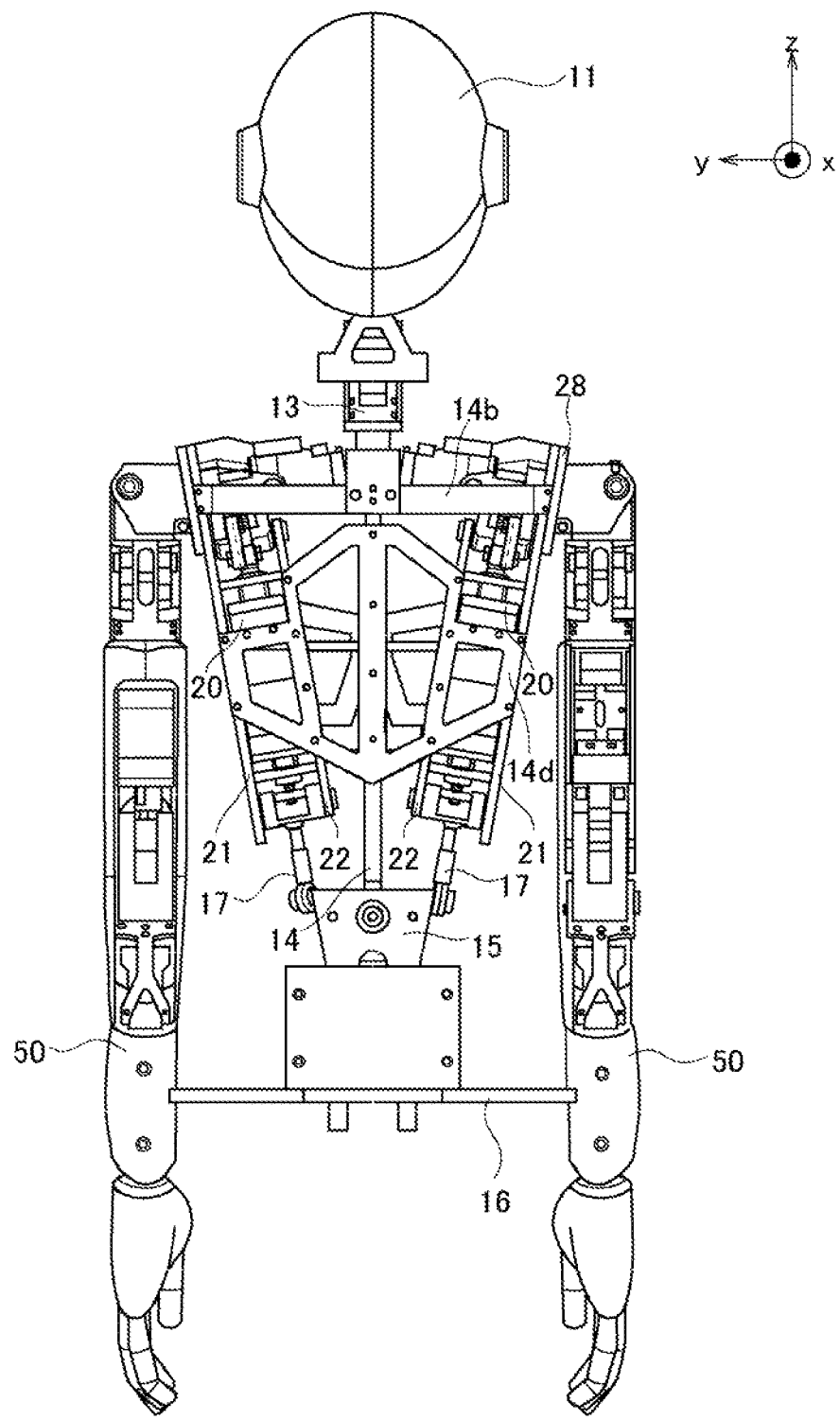

[Fig. 4]
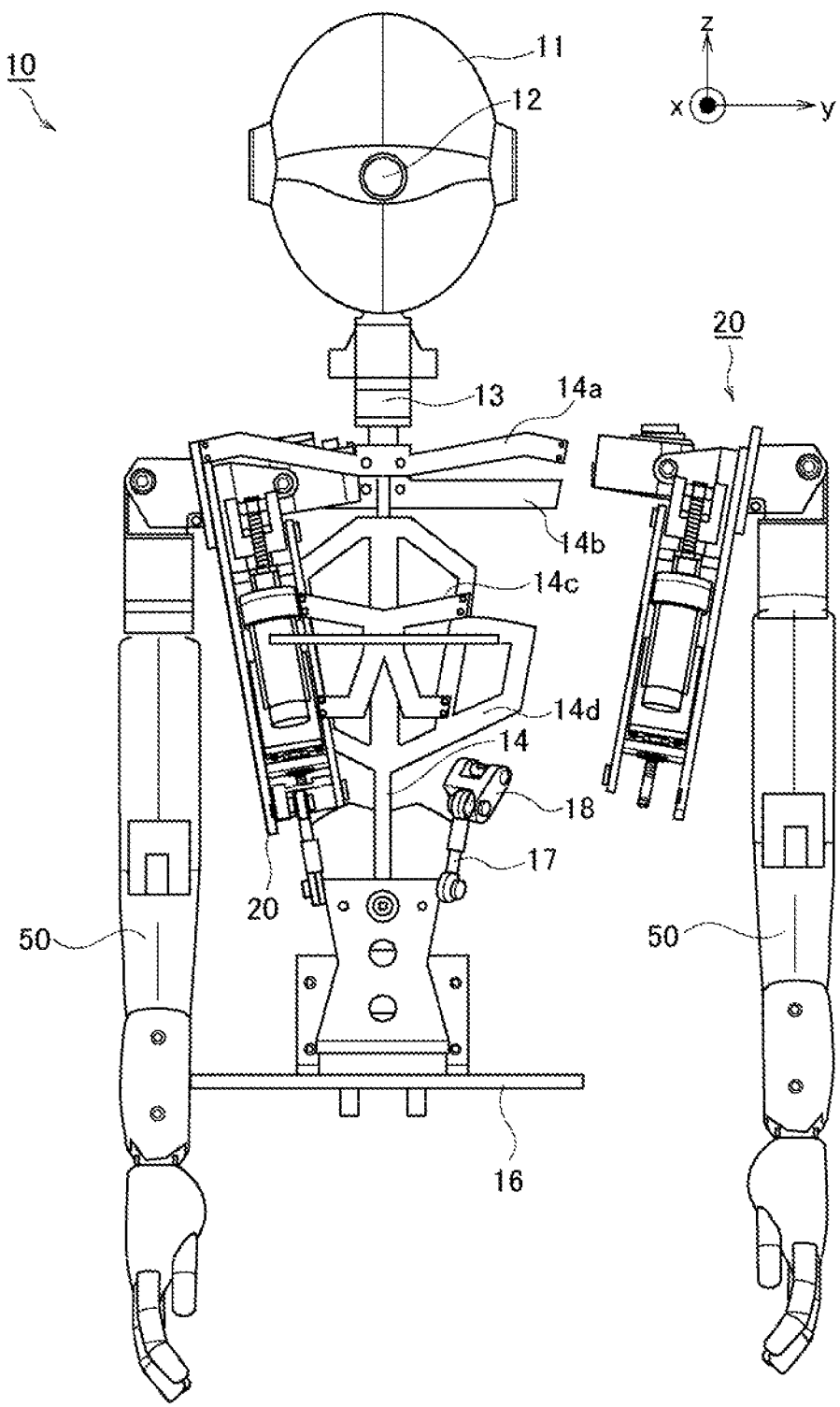

[Fig. 5]
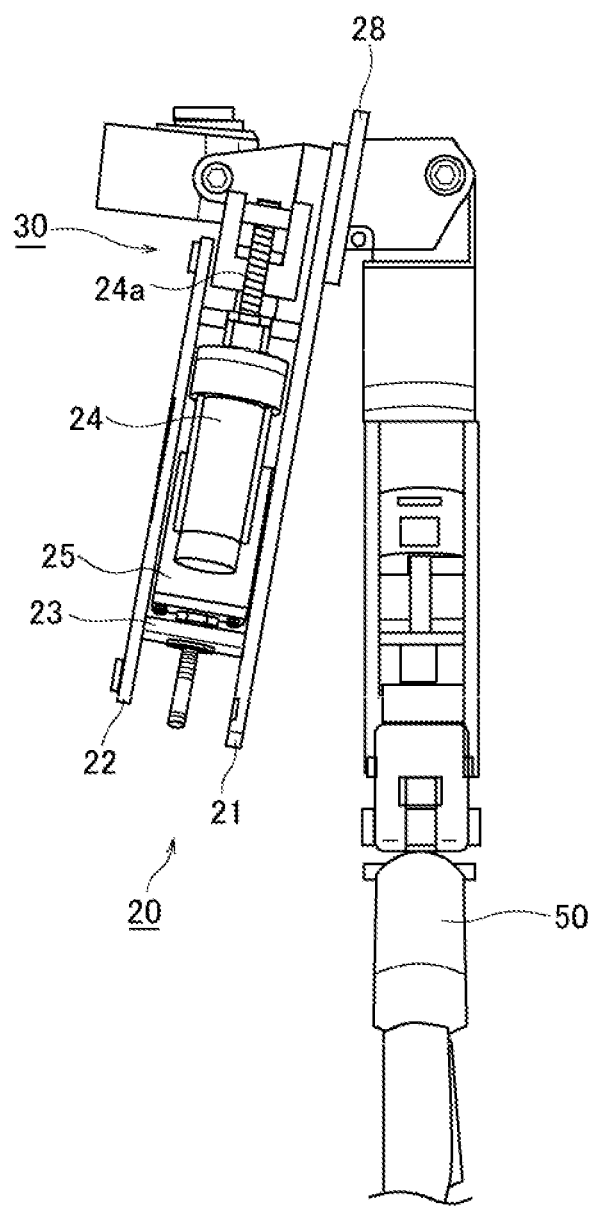

[Fig. 6]
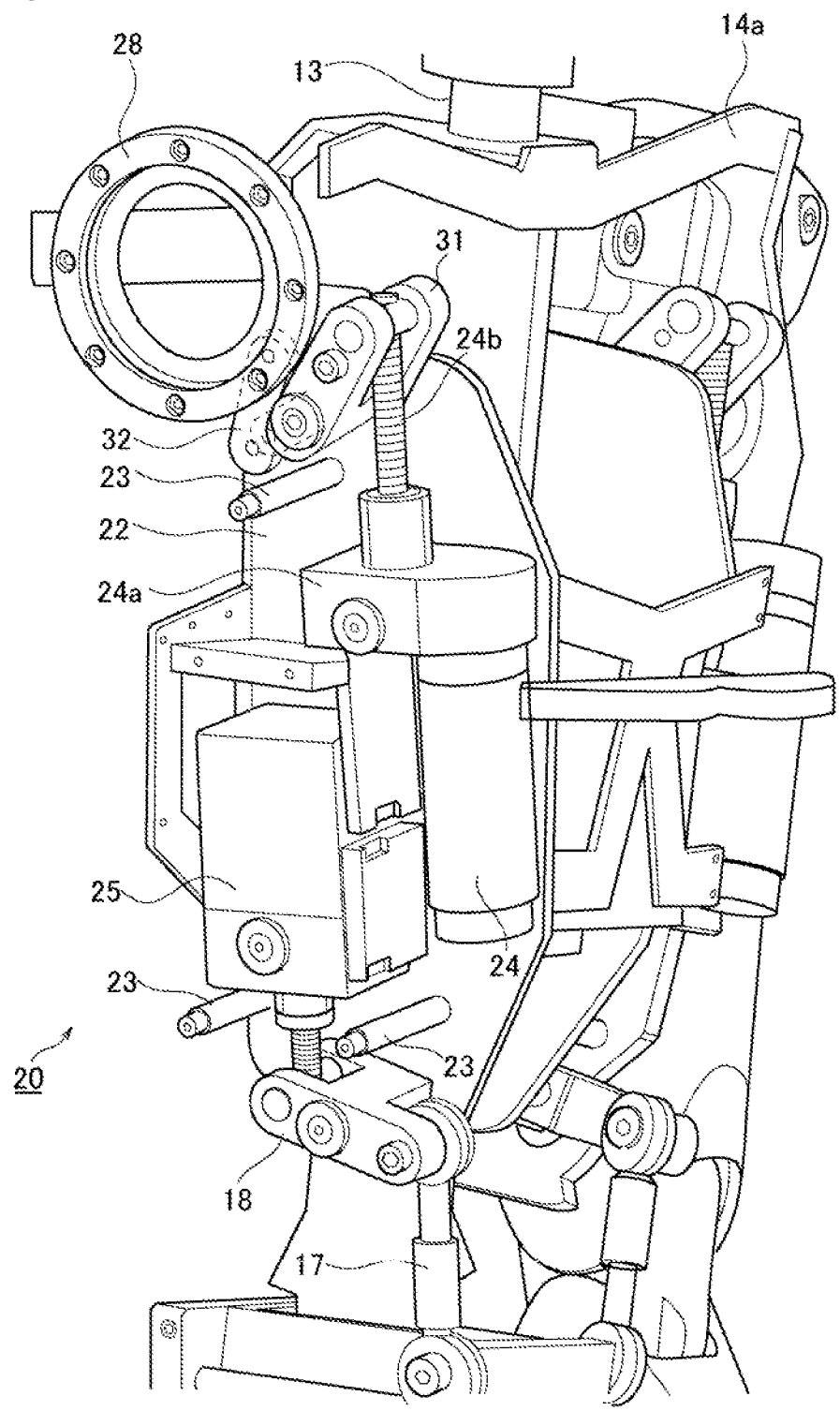

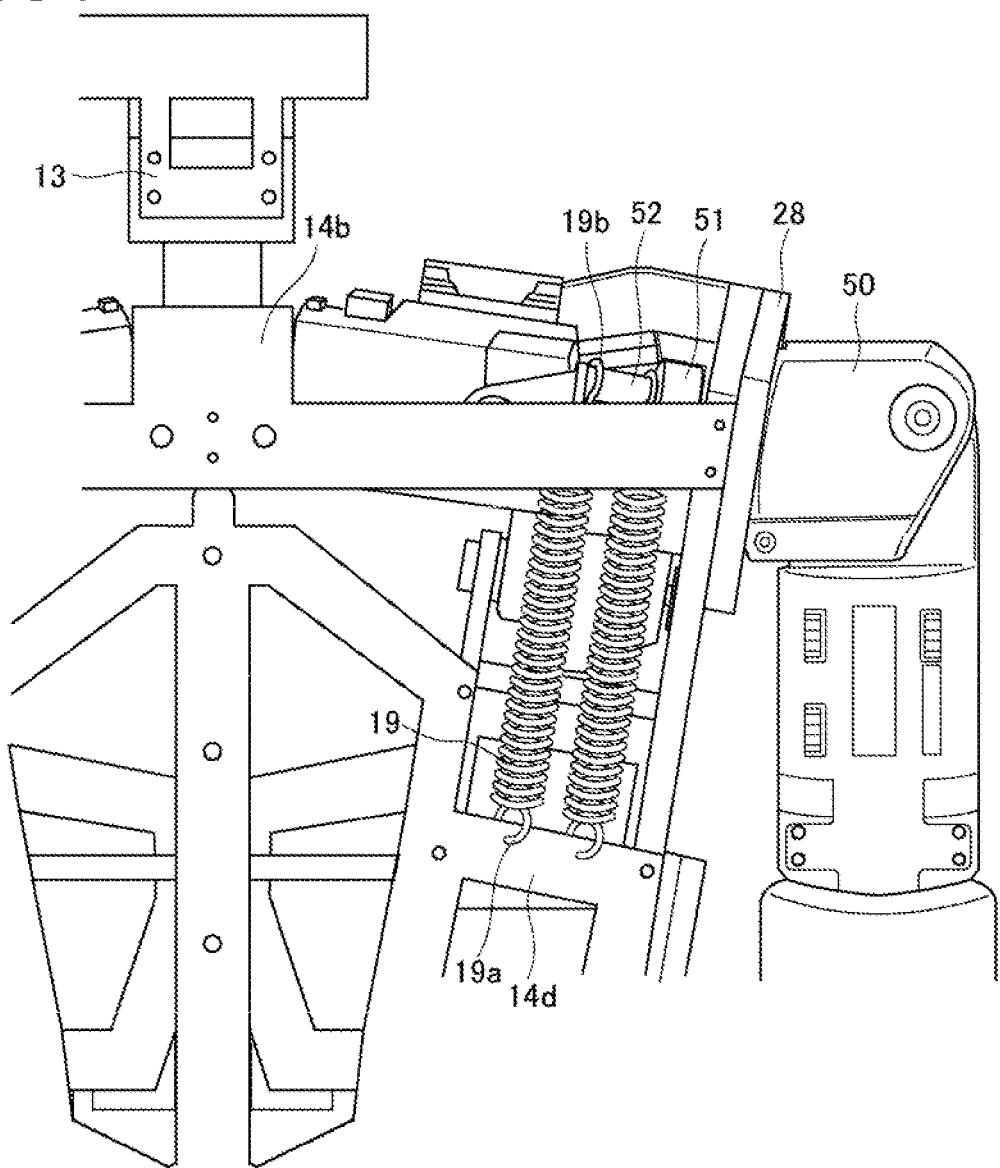
[Fig. 7]

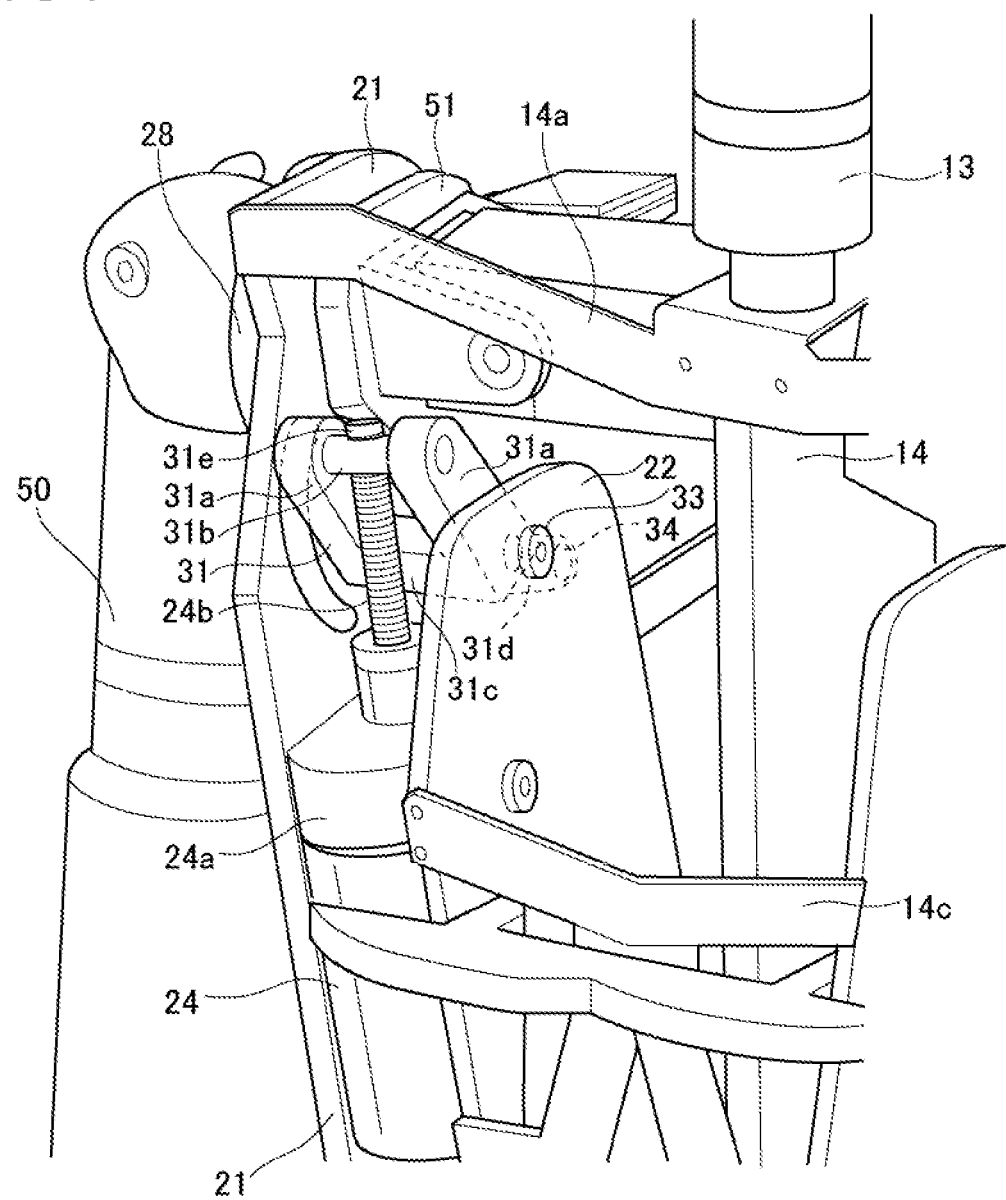
[Fig. 8]

[Fig. 9]
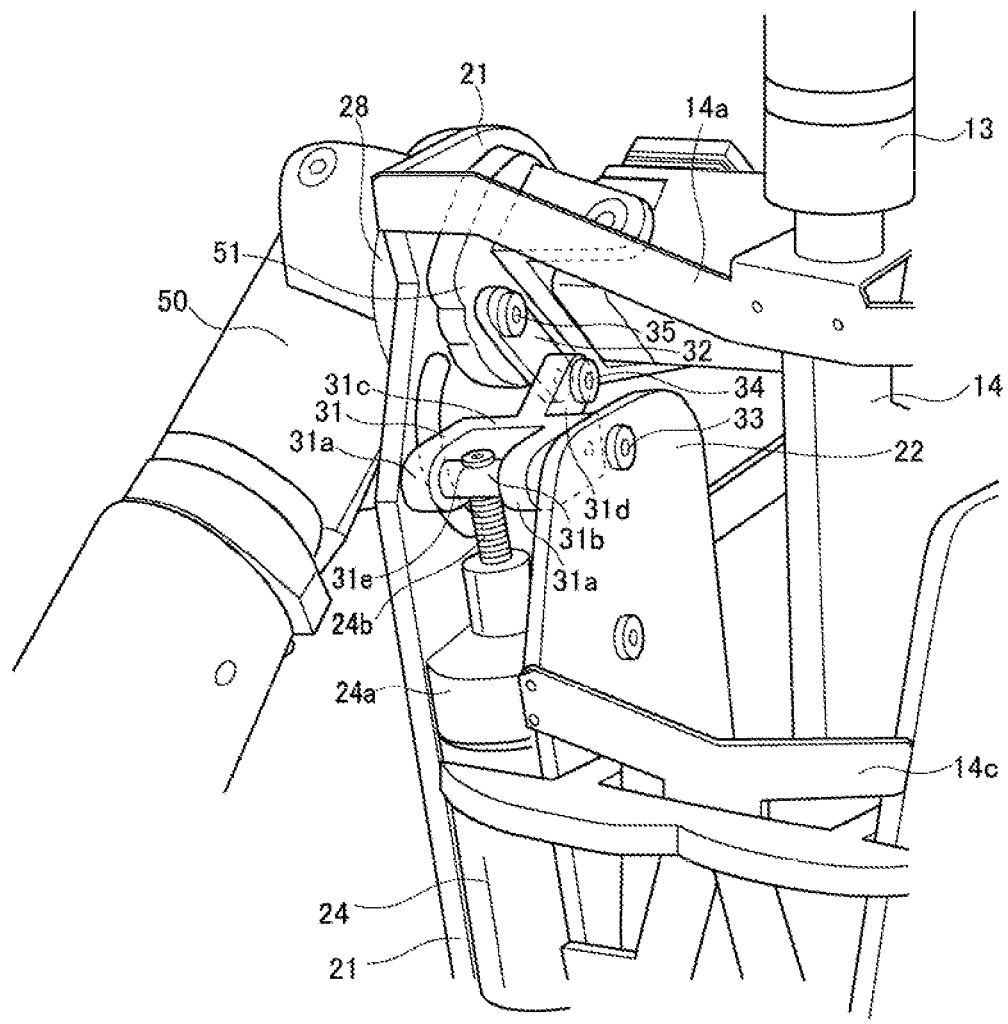

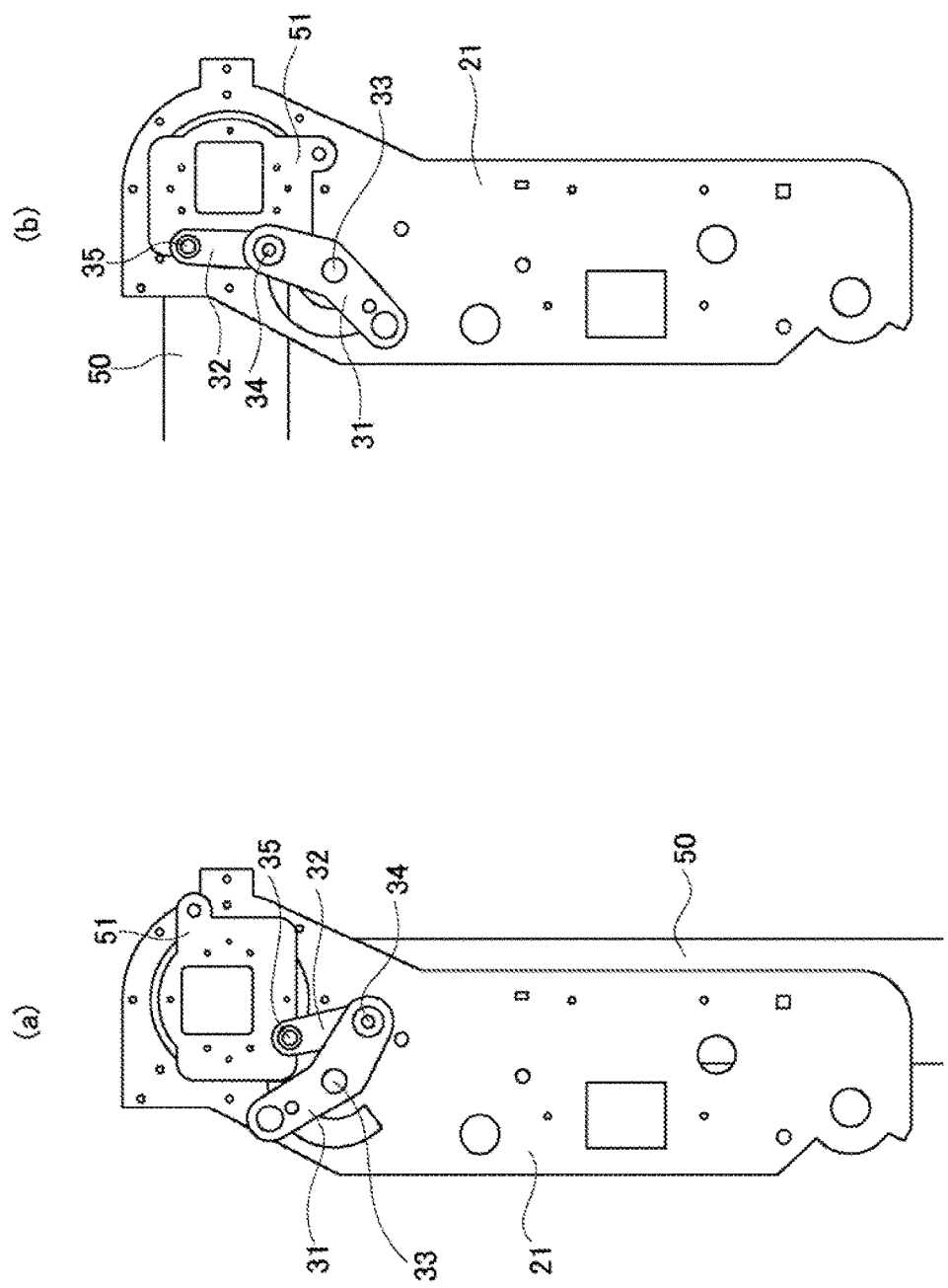
[Fig. 10]

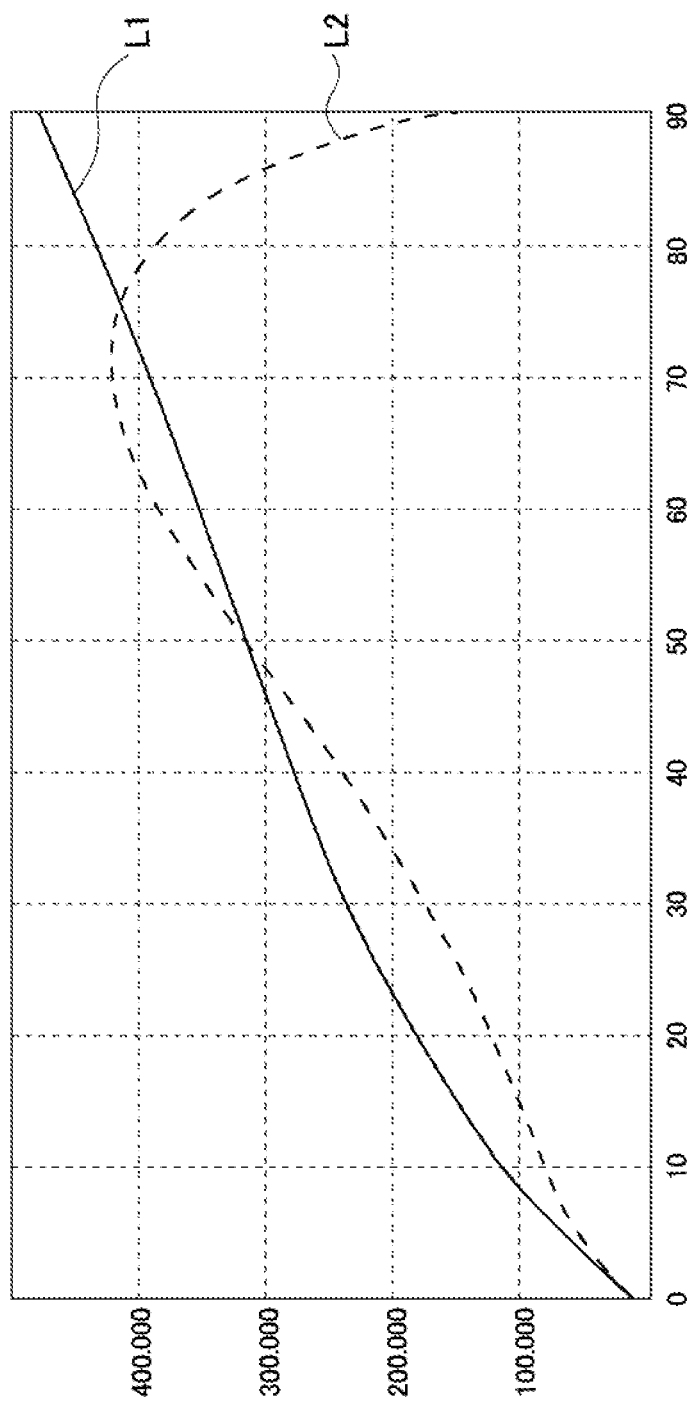
[Fig. 11]

ROTATIONAL DRIVING MECHANISM IN A ROBOT

TECHNICAL FIELD

The present invention relates to a rotational driving mechanism for driving to rotate a rotary member in a robot.

BACKGROUND ART

In recent years, there have been actively made research and development of not only industrial robots but also consumer robots, which play various roles for people's livelihood. Among such robots, human-like robots (humanoid robot) being able to walk in erect posture are expected to be able to substitute for actions of human beings. In such humanoid robots, many joint parts are provided for imitating actions or motions of a human being, and a variety of motions having a plurality of degrees of freedom in the joint parts are required. For that reason, in each of the joint parts of the humanoid robots, the number of actuators such as servo-motors mounted therein increases corresponding to the degrees of freedom given to each joint part, with the result that it becomes difficult to reduce the size of each joint part due to this, and the structure and arrangement of the actuators are made complicated.

Here, for example, in patent literature 1, there is disclosed a joint part arrangement in which two actuators are arranged side by side (or in parallel) in a joint part of a robot, and an output shaft of each actuator is connected with a linkage mechanism which is formed of an intermediate link and an arm, wherein the arm of each linkage mechanism is connected with a base member of the joint part through a cross shaped universal coupling. In such a construction, when each actuator is made to carry out a predetermined action, a motion of two degrees of freedom can be achieved in the joint part, and in this technology, a motion of each degree of freedom is carried out by always driving the two actuators, as a result of which each actuator can be reduced in size, and the arrangement of the actuators is also such that both of the actuators are merely arranged in parallel.

CITATION LIST

Patent Literature

[PATENT LITERATURE 1] Japanese patent laid-open publication No. 2013-91122

SUMMARY OF THE INVENTION

Technical Problem

However, with the above-mentioned construction of the conventional joint part, the output shaft of each actuator and the arm of each related linkage mechanism are arranged substantially in series with each other, so a relatively large dimension or size in a lengthwise direction is required as a space for receiving this construction, and a location in which the construction can be arranged in the robot naturally has restrictions. Moreover, in a joint part in which a rotary member such as an arm member of the robot adapted to be driven to rotate in a prescribed direction including a gravity component, there are many cases in the past where a rotary type servo-motor or the like as an actuator is mounted on the joint part and plays the role of driving the rotary member to rotate. With such a construction, in particular, when the rotation of the rotary member is made to increase, the load torque applied to the actuator will be increased, and hence, in general, it will become a situation where a relatively large and rigid actuator must be selected in consideration of the load torque thus increased.

In addition, in a joint part of a robot, a linkage mechanism may be used in order to cause a driving force of an actuator to be transmitted to a target to be driven. Although in the joint part shown in the above-mentioned patent literature 1, too, the linkage mechanisms are utilized for transmission of driving forces, the linkage mechanisms serve to make it possible to conduct the driving forces from the two juxtaposed actuators to the base member of the joint part in various modes, but it can not be said that the linkage mechanisms are formed in such a manner that the loads applied to the actuators at the time of driving the rotary members to rotate in the prescribed direction including a gravity component can be alleviated in a suitable manner. Moreover, in other conventional technologies, there can not be found, any mechanism for driving a rotary member to rotate, which achieves to alleviate a gravity load of an actuator in a suitable manner.

The present invention has been made in view of the problems as mentioned above, and has for its object to provide a rotational driving mechanism which can achieve the reduction in size of an actuator for rotational driving of a rotary member of a robot.

Solution to Problem

In the present invention, in order to solve the aforementioned problems, a linear motion actuator is adopted for rotational driving of a rotary member, and at the same time, there is also adopted such a construction that an output of the linear motion actuator is transmitted to the rotary member through a link part which rocks like a seesaw. With this, it becomes possible to cause the output of the linear motion actuator to be transmitted to the rotary member through a compact space.

Specifically, the rotational driving mechanism according to the present invention has a first link unit and a second link unit as a linkage mechanism. This first link unit has an input part to which a driving force (output) from the linear motion actuator is inputted, and an output part which outputs the driving force to the second link unit. Here, note that the inputting of the output of the linear motion actuator to the input part may be a direct input mode directly inputted from the linear motion actuator, or may be an indirect input mode inputted therefrom through a certain propagation member. Then, the first link unit will be rotatably mounted on a base member through a first support part, and said input part and said output part will be located at mutually opposite sides of a support point of the first support part. For that reason, the first link unit will operate as a rocking link rocking like a seesaw by the support of the first support part. That is, the direction of movement of the input part by the output from the linear motion actuator and the direction of movement of the output part become reverse with respect to each other.

Then, the second link unit is rotatably connected to the output part of the first link unit through a second support part, and in addition, the second link unit is rotatably connected to the rotary member or a connecting member joined thereto, through a third support unit. As a result, the output of the linear motion actuator inputted to the first link unit is transmitted to the second support part through the output part, and is further transmitted therefrom to the rotary member, whereby relative rotational driving of the rotary member and a base member on which the rotary member is mounted will be carried out. By such a construction, the length dimension of the entire rotational driving mechanism can be suppressed to be smaller in comparison with a conventional construction in which the output shaft of the linear motion actuator and the related arm are arranged in series, and the directions of movements thereof are the same. In addition, the first link unit is formed as a rocking link, so that by suitably adjusting the distance between the first support part and the input part of the first link unit as well as the distance between the first support part and the output part of the first link unit, it becomes possible to transmit the output of the linear motion actuator to the rotary member side while amplifying it by the first link unit, and hence, it also becomes possible to reduce the size of the linear motion actuator.

Further, the present invention can also be seen from another aspect, i.e., an aspect of a rotational driving mechanism for driving a rotary member of a robot to rotate in a prescribed direction including a gravity component by means of a linear motion actuator. In this case, the present invention is directed to a rotational driving mechanism which drives the rotary member which is a part of the robot, and which is mounted on a base member at the side of a main body of the robot, to rotate in the prescribed direction including the gravity component by means of the linear motion actuator having a linear motion output shaft, said rotational driving mechanism comprising: a first link unit that has a first link body and is mounted through a first support part on the base member in such a manner as to be free to rotate, said first link unit further having an input part to which an output of said linear motion actuator is inputted at one side of said first link body based on said first support part, and an output part located in said first link body at an opposite side of said input part across said first support part; and a second link unit that has a second link body and is mounted through a second support part on said output part of said first link unit in such a manner as to be free to rotate, said second link unit being further mounted through a third support unit on said rotary member or a connecting member joined thereto in such a manner as to be free to rotate. Then, said first link unit and said second link unit are formed in such a manner that in the case where said rotary member is in a horizontal raised position in which it becomes the closest to a horizontal state in a rotational movement range in said prescribed direction of said rotary member, an interlink angle formed by a first straight line connecting between a support point of said first support part and a support point of said second support part, and a second straight line connecting between the support point of said second support part and a support point of said third support part is larger, and the support point of said third support part is away in an upward direction from the support point of said first support member, in comparison with the case where said rotary member is in a lowermost position in which it comes close to a state of extending in the most downward direction from a mounting position thereof with said base member in said rotational movement range.

The rotational driving mechanism according to the present invention achieves the rotational driving of said rotary member in the prescribed direction by transmitting a driving force of the linear motion actuator to the rotary member. Here, the prescribed direction in which the rotary member rotates is a direction in which some or all of the gravity component of the rotary member acts on the linear motion actuator side in the process of the rotation thereof. Accordingly, the prescribed direction may be a direction of rotation included in a vertical plane in a robot, or may be a direction of rotation included in an inclined plane which is inclined by a prescribed angle from a horizontal plane. Thus, in cases where the prescribed direction is the direction of rotation included in the inclined plane, the gravity component of the rotary member according to the prescribed angle of that inclination will be applied to the linear motion actuator as a gravity load.

Then, in the rotational driving mechanism according to this aspect of the present invention, too, as in the same case as in the above-mentioned construction, the first link unit will operate as a rocking link rocking like a seesaw by the support of the first support part, so that the direction of movement of the output part becomes opposite to the direction of movement of the input part caused by the output of the linear motion actuator. Then, the output of the linear motion actuator inputted to the first link unit is transmitted to the second support part through the output part, and is further transmitted to the rotary member, whereby rotational driving of the rotary member in the prescribed direction will be carried out. Accordingly, as with the above-mentioned construction, the length dimension of the entire rotational driving mechanism can be suppressed to be small, and the reduction in size of the linear motion actuator can also be made.

Here, the "upward direction" and the "downward direction" in the present invention are terms each representing a direction in which the gravity load acts with respect to a driving actuator, for example, a vertical direction. Then, when the robot stands up from a mounting surface, a direction from the foot side to the head side of the robot is the upward direction, and the opposite thereof is the downward direction. Thus, in cases where the rotary member is in the lowermost position in the rotational movement range of the rotary member, the rotary member is in the state of being extended in the downward direction, so the linear motion actuator does not need substantially to support the gravity load of the rotary member. On the other hand, in cases where the rotary member is in the horizontal raised position in the rotational movement range, the rotary member is in a state closest to the horizontal in the rotational movement range, so the gravity load applied to the linear motion actuator becomes relatively large. Accordingly, the first link unit and the second link unit are formed in consideration of the correlation between the position of the rotary member in the rotational movement range and the gravity load applied to the linear motion actuator.

That is, the first link unit and the send link unit will operate in such a manner that in cases where the rotary member is in the horizontal raised position, the interlink angle is larger in comparison with the case where the rotary member is in the lowermost position, and the support point of the third support part connecting between the second link unit and the rotary member side is away in the upward direction from the support point of the first support part. Thus, each link unit operates in this manner, and so, in cases where the rotary member is in the horizontal raised position, the arrangement of the individual support points of the first support part, the second support part and the third support part included in both the link units comes close to be linear, and the support point of the third support part being the nearest to the rotary member will be located upper than the support point of the first support part nearest to the linear motion actuator, thus forming an upright state in which the individual support points of the first support part, the second support part and the third support part are arranged upright along the vertical direction, or a state close to the upright state.

As a result, the gravity load acting from the rotary member in the horizontal raised position will be supported by the support points of the individual support parts of the first link unit and the second link unit, and hence, in particular, most of the gravity load will be supported by the first support part connected to the base member. Thus, the gravity load applied substantially to the linear motion actuator can be reduced, thereby making it possible to attain the reduction in size of the linear motion actuator. Then, such an arrangement of the individual support points of the first support part, the second support part and the third support part can be made possible due to the construction in which the first link unit is formed as a rocking type link unit as mentioned above, and the input part and the output part are arranged at the mutually opposite sides of the first support part.

Here, note that the horizontal raised position in the present invention is a position in which the rotary member is in a state closest to the horizontal in the rotational movement range of the rotary member, i.e., a position in which the rotary member is in a state closest to a state where the gravity load acting from the rotary member on the linear motion actuator becomes a maximum. Accordingly, the horizontal raised position is not necessarily limited to the position in which the rotary member is in the horizontal state. Similarly, the lowermost position in the present invention is a position in which the rotary member extends in the most downward direction in the rotational movement range of the rotary member, i.e., a position in which the rotary member is in a state closest to a state where the gravity load acting from the rotary member on the linear motion actuator becomes a minimum. Accordingly, the lowermost position is not necessarily limited to the position in which the rotary member extends in the vertically downward direction.

Advantageous Effects of Invention

A rotational driving mechanism can be provided which can achieve the reduction in size of an actuator for rotational driving of a rotary member of a robot.

BRIEF DESCRIPTION OF DRAWINGS

FIG. 1 is a front elevation of a robot to which rotational driving mechanisms according to the present invention is applied.

FIG. 2 is a side elevation of the robot shown in FIG. 1.

FIG. 3 is a rear elevation of the robot shown in FIG. 1.

FIG. 4 is a view showing a state where an arm unit and a driving unit are removed, in the robot shown in FIG. 1.

FIG. 5 is a view showing the driving unit removed in FIG. 4.

FIG. 6 is a first view showing the construction of a rotational driving mechanism according to the present invention.

FIG. 7 is a second view showing the construction of the rotational driving mechanism according to the present invention.

FIG. 8 is a third view showing the construction the rotational driving mechanism according to the present invention.

FIG. 9 is a fourth view showing the construction of the rotational driving mechanism according to the present invention.

FIG. 10 is a first view showing the operation of a link mechanism included in the rotational driving mechanism according to the present invention.

FIG. 11 is a second view showing the operation of the link mechanism included in the rotational driving mechanism according to the present invention.

MODES FOR CARRYING OUT THE INVENTION

Hereinafter, specific modes or embodiments of the present invention will be described based on the attached drawings. However, the dimensions, materials, shapes, relative arrangements and so on of component parts described in the embodiments are not intended to limit the technical scope of the present invention to these alone in particular as long as there are no specific statements.

Embodiment 1

<Construction of Robot 10>

Reference will be made to the overall construction of a robot 10 on which rotational driving mechanisms according to the present invention are mounted, based on FIGS. 1 through 3. FIG. 1 is a front elevation of the robot 10, FIG. 2 is a left side view of the robot 10, and FIG. 3 is a rear elevation of the robot 10. Here, note that in each of these figures, the internal structure of the robot 10 is shown in a state where a main body cover is omitted except for a left hand, for the sake of easy and clear understanding. Also, note that in this embodiment, assuming that the direction of advancement of the robot 10 is set as a positive or plus direction of an x axis, and that a left hand direction as viewed from the robot 10 is set as a positive or plus direction of a y axis, and that an antigravity direction in the robot 10 is set as a positive or plus direction of a z axis, the x axis is a roll axis, and the y-axis is a pitch axis, and the z-axis is a yaw axis. Accordingly, a rotation around the x axis becomes a roll motion, and a rotation around the y axis becomes a pitch motion, and a rotation around the z axis becomes a yaw motion. In addition, an upward direction in this embodiment is the positive or plus direction on the z axis, i.e., the antigravity direction, and on the other hand, a downward direction is the negative or minus direction of the z axis, i.e., the gravity direction. A left and right direction is a left and right direction when viewed from the robot 10, wherein the positive or plus direction on the y axis becomes a left direction, and a negative or minus direction on the y axis becomes a right direction.

The robot 10 is a humanoid robot and has a body which imitates a skeletal structure of a human being. Schematically, the skeletal structure of the upper half of the body of the robot 10 (hereinafter, referred to simply as an "upper half body skeletal structure") is formed of a backbone part 14 extending in the z axis direction in FIG. 1 and including various kinds of later-mentioned bone parts 14a-14d formed of sheet metal, a haunch bone part 15 connected with the backbone part 14 so as to support it, and a pelvic part 16 which further support the haunch bone part 15 and to which an unillustrated pair of legs of the robot 10 is connected. Then, the neck 13 of the robot 10 is connected to the backbone part 14, and further, a head 11 is arranged on the neck 13. Here, note that a camera for photographing outside is mounted on the head 11. By the connection of the head 11 with the backbone part 14 through this neck 13, it becomes possible for the head 11 to perform a roll motion and a yaw motion with respect to the backbone part 14, but the internal structure of the robot for these motions does not make the core of the present invention, so a detailed explanation thereof is omitted in this description.

In addition, in the robot 10, driving units 20 for managing the drive of the upper half of the body are arranged corresponding to an upper right half body and an upper left half body, respectively. Here, as shown in FIG. 4, an anterior clavicular part 14a at the front side of the robot and a posterior clavicular part 14b at the back side of the robot are connected to the backbone part 14 at locations positioned in shoulder parts of the robot 10. Moreover, an anterior sternal part 14c at the front side of the robot and a posterior sternal part 14d at the back side of the robot are connected to the backbone part 14 at locations positioned in a chest part (a portion lower than the shoulder parts) of the robot 10. Predetermined spaces are formed by these bone parts 14a-14d and the backbone part 14 at the right and left sides of the backbone part 14, respectively, in the upper half of the body of the robot 10. The driving units 20 are arranged so as to be received in the predetermined spaces at the right and left sides, respectively, and the driving units 20 are connected with respect to the individual bone parts 14a-14d. As a result of this, the two driving units 20 are mounted in the interior of the robot 10. The bone parts 14a-14d are formed of flat plate-shaped sheet metal with respect to the backbone part 14, so the mounting of the driving units 20 with respect to the backbone part 14 will be carried out relatively resiliently.

<Construction of the Driving Units 20>

In FIG. 4, there is shown a state in which an arm unit 50 at the left-hand side of the robot 10 and the corresponding driving unit 20 for the upper left half body are removed in unison from the upper half body skeletal structure of the robot 10. Thus, the driving units 20 are each constructed so as to be removable from the upper half body skeletal structure of the robot 10 together with the corresponding arm unit 50, whereby assembly efficiency and maintenance of the robot 10 are maintained in a suitable manner. In each of the driving units 20, a rotational driving mechanism according to the present invention is mounted, and rotational driving of the corresponding arm unit 50, which corresponds to a rotary member according to the present invention, will be carried out by this rotational driving mechanism. Hereinafter, based on FIG. 5 and FIG. 6, the details of the rotational driving mechanisms will be explained. Here, note that the driving unit 20 for the upper left half body of the robot 10 is disclosed or shown in FIG. 5, and on the other hand, a detailed structure of the driving unit 20 for the upper right half body of the robot 10 is disclosed in FIG. 6. Also, note that in FIG. 6, in order to show the interior of the driving unit 20, a part of the construction thereof (the construction of an outer base plate 21, etc., to be described later) is omitted. In addition, in this description, the driving unit 20 for the upper left half body and the driving unit 20 for the upper right half body have the same construction, and so, an explanation given based on FIG. 5 and FIG. 6 is applied to the driving units 20 and the rotational driving mechanisms in the interiors thereof at the opposite sides.

Each driving unit 20 has an accommodation space which is defined by an outer base plate 21 and an inner base plate 22 connected to the upper half body skeletal structure of the robot 10, and by a spacer 23 arranged between both of the base plates. In a state where an arm unit 50 is connected to the corresponding driving unit 20, the outer base plate 21 is a base plate arranged at the outer side of the robot 10, i.e., at a side close to the arm unit 50, and the inner base plate 22 is a base plate arranged at the inner side of the robot 10. Here, note that a support member 28 for supporting the arm unit 50 so as to be free to rotate with respect to the pitch axis is mounted on the outer base plate 21, so that the arm unit 50 is connected to the side of the driving unit 20 through the support member 28. For this support member 28, it is preferable to adopt a support member which can support loads in all directions, such as a radial road, an axial load, etc., by means of one bearing, in consideration of the point that the arm unit 50 of the robot 10 having a relatively large moment is supported within a limited space volume. For example, it is possible to adopt a cross roller ring manufactured by THK CO., LTD.

Then, the spacer 23 is a rod-shaped member which has a length defining the interval of both the base plates. The construction formed by the outer base plate 21, the inner base plate 22 and the spacer 23 is, so to speak, to form the housing of the driving unit 20, wherein this housing is fixed to the upper half body skeletal structure of the robot 10, and three actuators 24, 25, 26 and a linkage mechanism 30 related to the actuator 24 are arranged there. Here, note that the outer base plate 21 included in the housing corresponds to a base member according to the present invention.

First, the actuator 24 will be explained. The actuator 24 is a linear motion actuator which has a servo-motor, a main body 24a, and an output shaft 24b performing linear movement in the axial direction of the actuator, and is fixed to the outer base plate 21 and the inner base plate 22. The output shaft 24b has a spiral thread groove formed on the outer peripheral surface thereof, and a ball screw nut (not shown) threadedly engaged with the thread groove of the output shaft 24b is received in the main body 24a in such a state that only rotation thereof around an axis line of the main body is permitted. Then, the servo-motor is connected with the main body 24a so as to rotate the ball screw nut, and the movement of the ball screw nut in the axial direction is limited within the main body 24a, so that the output shaft 24b is caused to perform rectilinear movement, i.e., linear motion in the axial direction by the drive of the servo-motor.

The output shaft 24b of the actuator 24 is connected to a first link unit 31 among the first link unit 31 and a second link unit 32 which together constitute the linkage mechanism 30. Here, note that this linkage mechanism 30 corresponds to the rotational driving mechanism according to the present invention. Then, the first link unit 31 has two wall portions 31a extended in the same direction from the opposite ends of a base portion 31c, as shown in FIG. 8 and FIG. 9 to be described later, and a bridge 31b connecting both the wall portions 31a with each other is arranged in such a manner as to be parallel to the base portion 31c. This base portion 31c is supported by a bearing corresponding to a first support part according to the present invention in such a manner as to be free to rotate with respect to the outer base plate 21 and the inner base plate 22, thereby forming a first support point 33 which is a support point of the first support part. In addition, the output shaft 24b of the actuator 24 is connected to the bridge 31b in such a manner that the direction thereof with respect to the first link unit 31 becomes variable, wherein a connection point between the actuator output shaft and the bridge is denoted by 31e. Moreover, a tail portion 31d extending from the base portion 31c is arranged at the opposite side of the bridge 31b across the base portion 31c. The extending direction of the tail portion 31d is not on a straight line connecting between the connection point 31e on the bridge 31b and the first support point 33, but is a direction in which the actuator 24 is not arranged with respect to the straight line, i.e., a direction in which a third support point 35 to be described later is located. This second link unit 32 is supported by a bearing corresponding to a second support part according to the present invention in such a manner as to be free to rotate at an end of the tail portion 31d (i.e., an end at the opposite side of a connection portion thereof with the base portion 31c), thereby forming a second support point 34 which is a support point of the second support part.

In this manner, the first link unit 31 is formed as a link body (corresponding to a first link body according to the present invention) which comprises the wall portions 31a, the bridge 31b, the base portion 31c and the tail portion 31d. Then, the first link unit 31 is such that when the first support point 33 supporting the link body of the first link unit 31 for free rotation is taken as a reference, the bridge 31b to which the output shaft 24b of the actuator 24 is connected is located at one side of the first support point 33, and the tail portion 31d to which the second link unit 32 is connected is located at the other side of the first support point 33. For that reason, a point on which the output of the actuator 24 acts, i.e., the connection point 31e at which the output of the actuator 24 is inputted to the first link unit 31, and a point at which a force is transmitted through the first link unit 31 to the side of the second link unit 32, i.e., the second support point 34 at which the output from the actuator 24 is outputted to the side of the second link unit 32, have a correlation where they rock like a seesaw on the basis of the first support point 33, and in addition, the first link unit 31 is formed as a rocking link. More specifically, the first link unit 31 is formed in the following manner: when the connection point 31e moves in the upward direction, the second support point 34 will move in the downward direction, and on the contrary, when the connection point 31e moves in the downward direction, the second support point 34 will move in the upward direction. Thus, by forming the first link unit 31 as the rocking link, it is possible to suppress the size of the mechanism required to transmit the output of the actuator 24, in particular the length dimension thereof. In addition, it also becomes possible to attain amplification of the output of the actuator 24 by making use of the seesaw shape of the first link unit 31, and this also contributes to the reduction in size of the actuator 24.

Subsequently, the second link unit 32 is rotatably connected at its one end with the tail portion 31d of the first link unit 31 at the second support point 34, as mentioned above, and is further supported at its other end by a bearing corresponding to a third support part according to the present invention in such a manner as to be free to rotate with respect to a plate 51 (corresponding to a connecting member according to the present invention) connected with an end of the arm unit 50 of the robot 10, as shown in FIG. 9 to be described later, thus forming a third support point 35 which is a support point of the third support part. Thus, the second link unit 32 is formed so as to have a plate-shaped main body (corresponding to a second link body according to the present invention) including the second support point 34 and the third support point 35, and the second link unit 32 serves to transmit a force propagated from the first link unit 31 to the plate 51. This plate 51 is a plate connected with the end of the arm unit 50 rotatably mounted through the support member 28, and rotates together with the arm unit 50 in accordance with the rotation of the arm unit 50 in the pitch direction. Then, the support point 35 is located in a place which is shifted by a predetermined distance from the center of rotation in the pitch direction of this arm unit 50, and the force transmitted to the plate 51 through the first link unit 31 and the second link unit 32 becomes a driving force which causes the arm unit 50 to rotate in the pitch direction.

In this manner, the driving force of the actuator 24 is transmitted to the arm unit 50 by means of the linkage mechanism 30 composed of the first link unit 31 and the second link unit 32, whereby the rotary motion in the pitch direction of the arm unit 50 will be caused. Then, the arm unit 50 is supported by the support member 28 on the outer base plate 21, and the first link unit 31 is rotatably supported on the outer base plate 21 and the inner base plate 22, so that the directions of rotation of the first link unit 31 and the second link unit 32 become the same direction as the rotation in the pitch direction of the arm unit 50.

Next, the actuator 25 will be explained. The actuator 25 is also a linear motion actuator, as in the case of the actuator 24, and the principle of operation thereof is also the same. The output shaft of the actuator 25 is connected to one end side of a rocking link part 18 which is rotatably mounted on the outer base plate 21 and the inner base plate 22 through the support point 18a. Then, to the other end side of the rocking link part 18, a transmission link part 17 is rotatably connected through a support point 18b, and the transmission link part 17 is further connected to the haunch bone part 15. This rocking link part 18 has a seesaw shape as in the above-mentioned first link unit 31, and hence, the size of the mechanism required to transmit the output of the actuator 25, in particular the length dimension thereof, can be suppressed, and further, it also becomes possible to attain amplification of the output of the actuator 25, and this also contributes to the reduction in size of the actuator 25.

In the upper right and left halves of the body of the robot 10, the output of the actuator 25 is transmitted to the haunch bone part 15, whereby the upper half body of the robot 10 will be driven to rotate in the roll direction and in the yaw direction with respect to the pelvic part 16 due to an unillustrated detailed construction of the haunch bone part 15. Here, note that the rotational driving of the upper half body with respect to this pelvic part 16 is not caused by the rotational driving mechanism according to the present invention, so a detailed explanation thereof is omitted.

In addition, only the actuator 25 is included in the driving unit 20, and the rocking link part 18 and the transmission link part 17, which are links related to the actuator 25, are not included in the driving unit 20 (refer to a state where the driving unit has been removed, as shown in FIG. 4). This is because when the connection between the transmission link part 17 and the haunch bone part 15 is removed or disconnected at the time of removal of the driving unit 20, the rocking link part 18 and the transmission link part 17 will protrude from the housing of the driving unit 20, and handling thereof will become difficult. Of course, the driving unit 20 may be removed from the upper half body skeletal structure, so that the rocking link part 18 and the transmission link part 17 may be included in the driving unit 20.

Then, the rear structure of the robot 10 will be explained based on FIG. 7. FIG. 7 is a view showing the rear structure of the driving unit 20. As shown in FIG. 7, there is arranged a spring mounting portion 52 extending from on the plate 51 along a shoulder width direction of the robot 10. Two springs 19 for applying an urging force to the posterior sternal part 14d are mounted on this spring mounting portion 52. The springs 19 correspond to a spring member according to the present invention, and the connection position of each spring 19 in the posterior sternal part 14d is represented by 19a.

The spring mounting portion 52 is on the plate 51 which performs pitch rotation together with the arm unit 50, and the connection position 19a is at the side of the posterior sternal part 14d which forms the upper half body skeletal structure of the robot 10, so the urging force by the springs 19 will produce a torque which contributes to the pitch rotation of the arm unit 50. This urging force by the springs 19 will be described later.

<Operation of the Link Mechanism 30>

The linkage mechanism 30 is composed of the first ink 31 and the second link unit 32 as mentioned above, and serves to transmit the driving force of the actuator 24 to the plate 51 connected with the arm unit 50, whereby the arm unit 50 will be driven to rotate in the pitch direction. Then, this linkage mechanism 30 corresponds to the rotational driving mechanism according to the present invention, and hereinafter, the details of the operation thereof will be explained based on FIG. 8, FIG. 9 and FIG. 10.

FIG. 8 shows a state inside the driving unit 20 around the linkage mechanism 30 in a state where the arm unit 50 is in the most downward or lowermost position in which it extends in the most downward direction along the gravity component in a state where the arm unit 50 extends in the vertically downward direction, i.e., in a state where the arm unit 50 is rotatably supported by the support member 28. On the other hand, FIG. 9 shows a state inside the driving unit 20 around the linkage mechanism 30 in a state where the arm unit 50 is in a horizontal raised position in which it is caused to rise from the most downward or lowermost position against the gravity component in a state where the arm unit 50 extends in the horizontal direction, i.e., in a state where the arm unit 50 is rotatably supported by the support member 28. That is, FIG. 8 represents a state where the gravity load on the actuator 24 by the self weight of the arm unit 50 becomes a minimum, and FIG. 9 represents a state where the gravity load becomes a maximum.

Moreover, FIG. 10 shows the individual link units constituting the linkage mechanism 30 each in a state of being projected on a z-y plane so as to make it easy to grasp the state of each link unit. For that reason, the first link unit 31 is represented by a recumbent V shape or a doglegged shape in which a straight line connecting between the connection point 31e and the first support point 33 and a straight line connecting between the first support point 33 and the second support point 34 bend with respect to each other. Here, note that specifically, the left figure (a) of FIG. 10 shows the state of the linkage mechanism 30 in the case of the arm unit 50 being in the lowermost position, as shown in FIG. 8, and the right figure (b) of FIG. 10 represents the state of the linkage mechanism 30 in the case of the arm unit 50 being in the horizontal raised position, as shown in FIG. 9.

Here, the operation of the linkage mechanism 30 in the case of the arm unit 50 being driven to rotate from the lowermost position to the horizontal raised position in the robot 10 will be explained. In cases where the arm unit 50 is in the lowermost position in the robot 10, the output shaft 24b of the actuator 24 is in a state of being located at the most upward or uppermost position inside the driving unit 20, as shown in FIG. 8. Thus, as shown in (a) of FIG. 10, the second support point 34 is in a state where it is located at the most downward or lowermost position which the second support point 34 can take. For that reason, being influenced by the position of this second support point 34, there occurs a state where the second link unit 32 has drawn in the plate 51 to the downward direction, and hence, the lowermost position of the arm unit 50 through the state of the plate 51 shown in (a) of FIG. 10 will be decided.

In this manner, when the output shaft 24b is drawn into the main body 24a from the state shown in (a) of FIG. 8 under the drive of the actuator 24 (i.e., when the output shaft 24 moves linearly to the downward direction in the robot 10), the first link unit 31 will rotate around the first support point 33 in a counter clockwise direction, in (a) of FIG. 10. That is, due to the downward linear movement of the output shaft 24b, the connection point 31e corresponding to the input part in the first link unit 31 moves in the downward direction, and at the same time, the second support point 34 corresponding to the output part in the first link unit 31 moves in the upward direction. As a result, the second link unit 32 will push out the plate 51 in a clockwise direction, and hence, in FIG. 10, the arm unit 50 will rotate and rise in the clockwise direction in accordance with the rotation of the plate 51, whereby it will arrive at the horizontal raised position shown in (b) of FIG. 10.

Here, in the process of the rise due to rotation of this arm unit 50, attention is focused on an angle θ (an interlink angle according to the present invention) which is formed by a straight line connecting between the first support point 33 and the second support point 34 (corresponding to a first straight line according to the present invention), and a straight line connecting between the second support point 34 and the third support point 35 (corresponding to a second straight line according to the present invention). Because the first support point 33 is formed between the outer base plate 21 and the first link unit 31, and between the inner base plate 22 and the first link unit 31, the position of the first support point 33 remains unchanged with respect to the outer base plate 21 or the like, irrespective of the state of the first link unit 31. Then, as the first link unit 31 rotates in the counter clockwise direction from the state shown in (a) of FIG. 10, the second support point 34 goes up around this first support point 33, and the interlink angle θ, being an acute angle at the beginning, exceeds 90 degrees and comes to an obtuse angle, and then it becomes an angle close to 180 degrees in the final state shown in (b) of FIG. 10. That is, due to the counter clockwise rotation of the first link unit 31, the interlink angle θ gradually opens so as to approach 180 degrees, and the third support point 35 goes up so as to separate more from the first support point 33.

As a result, in the state where the arm unit 50 has risen to the horizontal, as shown in (b) of FIG. 10, the first straight line connecting between the first support point 33 and the second support point 34 and the second straight line connecting between the second support point 34 and the third support point 35 will extend substantially on a straight line and along the z-axis. At this time, the gravity load by the gravity component of the arm unit 50 becomes the maximum, but the three support points 33, 34, 35 in the linkage mechanism 30 are located on the first support point 33 substantially in alignment with each other in a straight line. For that reason, most of the gravity load transmitted from the arm unit 50 can be supported at the first support point 33 which is supported by the outer base plate 21 etc., thus making it possible to reduce the load transmitted to the side of the actuator 24 through the connection point 31e.

Moreover, in the linkage mechanism 30, in cases where the arm unit 50 is in a position in the vicinity of the horizontal raised position, the shapes and dimensions of the first link unit 31 and the second link unit 32 are decided so that the ratio of the amount of rotation of the plate 51 connected with the arm unit 50 with respect to the amount of displacement of the output shaft 24b of the actuator 24 becomes smaller, in comparison with the case where the arm unit 50 is in a position in the vicinity of the lowermost position. As a result of this, a speed reduction ratio, which is the ratio of the amount of displacement of the arm unit 50 with respect to the amount of displacement of the servomotor mounted on the actuator 24, will be set to be larger, as the arm unit 50 approaches the horizontal raised position.

For that reason, in the case where the arm unit 50 is in the vicinity of the lowermost position, the speed reduction ratio is relatively small, but the gravity load by the arm unit 50 is also small, so the degree of influence with respect to the actuator 24 can be kept small. On the other hand, in the vicinity of the horizontal raised position in which the gravity load by the arm unit 50 becomes relatively large, by making the speed reduction ratio larger, the degree of influence of the gravity load by the arm unit 50 to the actuator 24 can be reduced as much as possible, as a consequence of which it is possible to attain the reduction in size of the actuator 24.

In addition, in the robot 10, application of an urging force by means of the springs 19 is carried out, as shown in FIG. 7. This will be explained below based on FIG. 11. FIG. 11 shows the change over time of the gravity load by the arm unit 50 with respect to the angle of rotation of the arm unit 50, and the change over time of the urging force of the springs 19, by means of lines L1, L2, respectively. Here, note that on the axis of abscissa in FIG. 11, the angle of rotation in the case of the arm unit 50 being in the lowermost position (i.e., in the case of the state shown in (a) of FIG. 10) is 0 degrees, and the angle of rotation in the case of the arm unit 50 being in the horizontal raised position (i.e., in the case of the state shown in (b) of FIG. 10) is 90 degrees. In addition, the urging force of the springs 19 is applied in a direction in which torque for rising and rotating the arm unit 50 is generated in a range of angle of rotation shown in FIG. 11.

Here, as the arm unit 50 rotates and rises from the lowermost position to the horizontal raised position, the gravity load increases gradually, as can be seen from the line L1. At this time, as can be seen from the line L2, the urging force of the springs 19 is as follows: the mounting position and the spring constant of each spring are decided so that the urging force thereof becomes larger than the gravity load represented by the line L1 in a region before the arm unit 50 reaches the horizontal raised position (i.e. a region or position in which the angle of rotation substantially becomes from 50 degrees to 75 degrees, and which is called "a predetermined load region"). By such a design of the springs 19, in a region where the gravity load by the arm unit 50 becomes relatively large, the arm unit 50 can be supported by the urging force of the springs 19 in an effective manner, and the load applied to the actuator 24 can be reduced. Here, note that in a region where the gravity load by the arm unit 50 becomes further larger than that in the predetermined load region (i.e., a region or position in which the angle of rotation of the arm unit 50 substantially becomes from 75 degrees to 90 degrees), the speed reduction ratio due to the linkage mechanism 30 becomes relatively large, as mentioned above, and hence, even if the urging force of the springs 19 becomes lower in comparison with the load gravity, as shown in FIG. 11 the gravity load applied to the actuator 24 can be mitigated.

Further, as shown in FIG. 11, in a region where the gravity load by the arm unit 50 becomes smaller than that in the predetermined load region (i.e., a region or position in which the angle of rotation of the arm unit 50 substantially becomes from 0 degrees to 50 degrees), the speed reduction ratio due to the linkage mechanism 30 is relatively small, as mentioned above, but the gravity load by the arm unit 50 itself is relatively small, so even if the urging force of the springs 19 becomes lower in comparison with the load gravity, as shown in FIG. 11, the gravity load applied to the actuator 24 is not so large as to prevent the reduction in size of the actuator 24.

Thus, by setting the urging force of the springs 19 in consideration of the correlation thereof with the speed reduction ratio by the linkage mechanism 30, the gravity load applied to the actuator 24 can be reduced in the entire rotational driving range of the arm unit 50, and the reduction in size of the actuator 24 can be attained.

Here, returning to FIG. 10, reference will again be made to the linkage mechanism 30. In cases where the arm unit 50 is in the horizontal raised position, as shown in (b) of FIG. 10, the gravity load by the arm unit 50 can be supported at the first support point 33 in an efficient manner, as mentioned above, by the second support point 34 and the third support point 35 being located substantially in alignment with each other along the z axis on the basis of the first support point 33. At this time, the first link unit 31 is formed in a shape (i.e., a recumbent V or doglegged shape) bent unevenly to the side of the third support point 35, as mentioned above. For that reason, in cases where the connection point 31e of the first link unit 31 is displaced from the state shown in (a) of FIG. 10 to the state shown in (b) of FIG. 10, the first straight line connecting between the first support point 33 and the second support point 34 and the second straight line connecting between the second support point 34 and the third support point 35 are easier to come into alignment with each other due to the bent shape of the first link unit 31. In the linkage mechanism 30, in cases where the arm unit 50 is in the horizontal raised position, it is easy to obtain the effect due to the support of the gravity load by the first support point 33 because the first straight line and the second straight line come to a state of being closer to alignment with each other. Accordingly, the abovementioned bent shape in the first link unit 31 need only be designed in consideration of the support of the gravity load by this first support point 33.

In addition, it is also preferable to decide the abovementioned bent shape in the first link unit 31, from the point of view of the ease of carrying out rotational driving of the first link unit 31 from the state in which the first straight line and the second straight line has become aligned with each other. In the case where the first straight line and the second straight line has become aligned with each other, if the straight line connecting between the connection point 31e and the first support point 33 is located on an extension of the first straight line, etc., it becomes difficult to apply a return torque to the first link unit 31, at the time of returning from the state shown in (b) of FIG. 10 to the state shown in (a) of FIG. 10. Accordingly, it is preferable to decide the bent shape in the first link unit 31 in consideration of the ease of carrying out of the rotational driving of the first link unit 31.

Here, note that in this embodiment, a cross roller ring can be used as the support member 28 for the rotational support of the arm unit 50, as mentioned above. The cross roller ring is a support member capable of supporting loads from many directions. For that reason, for the support of loads with respect to the arm unit 50, a cross roller operates in a suitable, manner, and accordingly, the rigidity required of the actuator 24, which serves to manage the pitch rotation of the arm unit 50, can be made small, and from this, too, the reduction in size of the actuator 24 can be attained.

<Modification>

In the above-mentioned embodiment, in order to apply an urging force in the raising (upward) rotational direction to the arm unit 50, the springs 19 are arranged between the posterior sternal part 14d and the plate 51, but instead of such an arrangement, the springs 19 may be arranged between the first link unit 31 or the second link unit 32, which together constitute the linkage mechanism 30, and the upper half body skeletal structure of the robot 10. However, as shown in FIG. 10, both the link units may change in their states to a large extent in the rotational driving range of the arm unit 50, and hence, at the time of connecting the springs 19, it is necessary to connect them with the link units at positions at which the springs 19 do not interfere with both the link units.

REFERENCE SIGNS LIST

10 . . . robot,
14 . . . backbone part,
14*a* . . . anterior clavicular part,
14*b* . . . posterior clavicular part,
14*c* . . . anterior sternal part,
14*d* . . . posterior sternal part,
15 . . . haunch bone part,
19 . . . springs,
20 . . . driving units
21 . . . outer base plate,
22 . . . inner base plate,
24, 25 . . . actuators,
28 . . . support member,
30 . . . linkage mechanism
31 . . . first link unit
31*a* . . . wall portions,
31*b* . . . bridge,
31*c* . . . base portion,
31*d* . . . tail portion,
31*e* . . . connection point,
32 . . . second link unit
33 . . . first support point,
34 . . . second support point,
35 . . . third support point,
50 . . . arm unit,
51 . . . plate

The invention claimed is:

1. A rotational driving mechanism in a robot, which drives a rotary member, which is a part of the robot and which is mounted on a base member at the side of a main body of the robot so as to extend from its mounting position in a predetermined extension direction, to rotate in a prescribed direction including a gravity component by means of a linear motion actuator having a linear motion output shaft, said rotational driving mechanism comprising:
a first link unit that has a first link body and is mounted through a first support part on said base member in such a manner as to be free to rotate, said first link unit further having an input part to which an output of said linear motion actuator is inputted at one side of said first link body based on said first support part, and an output part located in said first link body at an opposite side of said input part across said first support part; and
a second link unit that has a second link body and is mounted through a second support part on said output part of said first link unit in such a manner as to be free to rotate, said second link unit being further mounted through a third support unit on said rotary member or a connecting member joined thereto in such a manner as to be free to rotate;
wherein said first link unit and said second link unit are formed in such a manner that in the case where said rotary member is in a horizontal raised position in which it becomes the closest to a horizontal state in a rotational movement range in said prescribed direction of said rotary member and in which a gravity load of said rotary member with respect to said linear motion actuator becomes a maximum, an interlink angle formed by a first straight line connecting between a support point of said first support part and a support point of said second support part, and a second straight line connecting between the support point of said second support part and a support point of said third support part is larger, and the support point of said third support part is more away in an upward direction from the support point of said first support member, in comparison with the case where said rotary member is in a lowermost position in which it comes close to a state of extending in the most downward direction from a mounting position thereof with said base member in said rotational movement range and in which the gravity load of said rotary member with respect to said linear motion actuator becomes a minimum.

2. The rotational driving mechanism in a robot as set forth in claim 1, wherein
said first link unit is formed in such a manner that when said input part is moved in a downward direction by said linear motion actuator, said output part is moved in au upward direction by rotation thereof through said first support part of said first link body; and
in said first link unit, the support point of said second support part is not arranged on a straight line passing through said input part and the support point of and said first support part, but is arranged at the side of said third support part from said straight line.

3. The rotational driving mechanism in a robot as set forth in claim 1, wherein
when said rotary member is in a horizontal raised position, said interlink angle becomes an angle of 180 degrees or an angle in the vicinity of 180 degrees.

4. The rotational driving mechanism in a robot as set forth in claim 1, wherein
said first link unit and said second link unit are formed in such a manner that in the case where said rotary member is located in a predetermined upper position including said horizontal raised position, a ratio of an amount of rotation of said rotary member with respect to an amount of output of said linear motion actuator becomes smaller, in comparison with the case where said rotary member is located in a predetermined downward position including said lowermost position.

5. The rotational driving mechanism in a robot as set forth in claim 1, further comprising:
a spring member arranged between a main body side of said robot and a rotary member side for applying an urging force to cause said rotary member to rotate upwardly in said prescribed direction.

6. The rotational driving mechanism in a robot as set forth in claim 1, wherein
said rotary member is an arm unit of said robot; and
said prescribed direction is a pitch direction of said robot.

7. A rotational driving mechanism in a robot, which drives a rotary member, which is a part of the robot and which is mounted on a base member at the side of a main body of the robot, to rotate in a prescribed direction including a gravity component by means of a linear motion actuator having a linear motion output shaft, said rotational driving mechanism, comprising:
a first link unit that has a first link body and is mounted through a first support part on said base member in such a manner as to be free to rotate, said first link unit further having an input part to which an output of said linear motion actuator is inputted at one side of said first link, body based on said first support part, and an output part located in said first link body at an opposite side of said input pan across said first support part; and a second link unit that has a second link body and is mounted through a second support part on said output part of said first link unit in such a manner as to be free to rotate, said second link unit being further mounted through a third support unit on said rotary member or a connecting member joined thereto in such a manner as to be free to rotate;

wherein said first link unit and said second link unit are formed in such a manner that in the case where said rotary member is in a horizontal raised position in which it becomes the closest to a horizontal state in a rotational movement range in said prescribed direction of said rotary member, an interlink angle formed by a first straight line connecting between a support point of said first support part and a support point of said second support part, and a second straight line connecting between the support point of said second support part and a support point of said third support part is larger, and the support point of said third support part is more away in an upward direction from the support point of said first support member, in comparison with the case where said rotary member is in a lowermost position in which it comes close to a state of extending in the most downward direction from a mounting position thereof with said base member in said rotational movement range;

wherein said first link unit is formed in such a manner that when said input part is moved in a downward direction by said linear motion actuator, said output part is moved in an upward direction by rotation thereof through said first support part of said first link body; and wherein in said first link unit, the support point of said second support part is not arranged on a straight line passing through said input part and the support point of and said first support part, but is arranged at the side of said third support part from said straight line.

8. The rotational driving mechanism in a robot as set forth in claim 7, wherein when said rotary member is in a horizontal raised position, said interlink angle becomes an angle of 180 degrees or an angle in the vicinity of 180 degrees.

* * * * *